United States Patent
Konatham et al.

(10) Patent No.: US 9,506,835 B2
(45) Date of Patent: Nov. 29, 2016

(54) FUEL LEAK DETECTION SYSTEM FOR USE IN A TURBINE ENCLOSURE

(71) Applicant: General Electric Company, Schenectady, NY (US)

(72) Inventors: Rajesh Reddy Konatham, Bangalore (IN); Len Alan Wolf, Salem, MA (US); Laxmikant Merchant, Bangalore (IN); Rajakumar Alagappan, Bangalore (IN); Lakshmi Bettadapura Shankar, Bangalore (IN)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 14/259,716

(22) Filed: Apr. 23, 2014

(65) Prior Publication Data
US 2015/0308915 A1    Oct. 29, 2015

(51) Int. Cl.
G01M 3/16 (2006.01)
G01M 3/04 (2006.01)
F02K 9/38 (2006.01)
F02C 7/20 (2006.01)
G01M 15/14 (2006.01)

(52) U.S. Cl.
CPC ............ *G01M 3/04* (2013.01); *F02C 7/20* (2013.01); *F02K 9/38* (2013.01); *G01M 3/16* (2013.01); *G01M 15/14* (2013.01)

(58) Field of Classification Search
CPC ........ G01M 3/04; G01M 3/16; G01M 15/14; F02C 7/20; F02K 9/38
USPC ...................... 60/39.091, 796, 797
See application file for complete search history.

(56) References Cited

U.S. PATENT DOCUMENTS

| | | | | |
|---|---|---|---|---|
| 3,418,485 A | * | 12/1968 | Anderson | F01D 15/10 290/1 R |
| 5,514,920 A | * | 5/1996 | Key | G01F 23/2925 307/118 |
| 6,477,843 B2 | * | 11/2002 | Schroeder | F01D 25/12 60/772 |
| 6,962,057 B2 | * | 11/2005 | Kurokawa | F01D 25/24 248/646 |
| 6,983,607 B2 | * | 1/2006 | Grove | F01D 25/14 60/39.83 |
| 7,497,110 B2 | | 3/2009 | Liepert | |
| 2005/0081525 A1 | * | 4/2005 | Kaplan | F02C 7/14 60/734 |
| 2012/0067110 A1 | * | 3/2012 | Perten | G01F 23/04 73/53.01 |
| 2014/0080403 A1 | | 3/2014 | Erickson et al. | |

* cited by examiner

*Primary Examiner* — Steven Sutherland
(74) *Attorney, Agent, or Firm* — Armstrong Teasdale LLP

(57) ABSTRACT

A fuel leak detection system for use in a turbine enclosure is provided. The system includes a ventilation duct extending through an interior cavity of the turbine enclosure such that an extended portion of the ventilation duct is positioned within a bottom portion of the turbine enclosure. The ventilation duct includes a plurality of openings configured to allow air from within the turbine enclosure to be drawn into the ventilation duct through the plurality of openings. The system also includes a sensor system coupled in flow communication with the air drawn into the ventilation duct, the sensor system configured to detect fuel in the air.

20 Claims, 3 Drawing Sheets

US 9,506,835 B2

FUEL LEAK DETECTION SYSTEM FOR USE IN A TURBINE ENCLOSURE

BACKGROUND

The present disclosure relates generally to turbine engines and, more specifically, to systems and methods of fuel leak detection in turbine engine enclosures.

Gas turbine engines are used as a power source within a variety of applications. To protect the engine from the environment, and to shield the surrounding environment from the gas turbine engine, at least some known gas turbine engines are housed within an engine assembly enclosure that includes an inlet area, an exhaust area, such as an ventilation duct, and an engine area that extends between the inlet area and the exhaust area. For example in a power generation facility where the gas turbine engine is used as a power source for an electrical generator, the engine may be housed inside an enclosure that facilitates reducing noise and heat generated during engine operation.

Current regulatory codes may require that an engine control system provide an alarm to an operator and/or automatically stop the engine's operation when fuel leakage from fuel system components within the engine assembly enclosure exceeds a predetermined threshold. At least some known engine assembly enclosures include a hazardous gas detector located in a flow of ventilation duct air to determine the presence of fuel leaks. Moreover, at least some known engine assembly enclosures include a scavenging system that draws air from the enclosure towards a hazardous gas detector. However, accurate fuel leak detection may be difficult if leaked fuel is diluted in the flow of air channeled towards the hazardous gas detectors.

BRIEF DESCRIPTION

In one aspect, a fuel leak detection system for use in a turbine enclosure is provided. The system includes a ventilation duct extending through an interior cavity of the turbine enclosure such that an extended portion of the ventilation duct is positioned within a bottom portion of the turbine enclosure. The ventilation duct includes a plurality of openings configured to allow air from within the turbine enclosure to be drawn into the ventilation duct through the plurality of openings. The system also includes a sensor system coupled in flow communication with the air drawn into the ventilation duct, the sensor system configured to detect fuel in the air.

In another aspect, a gas turbine assembly is provided. The assembly includes a turbine enclosure including an interior cavity, and a ventilation duct extending through the interior cavity such that an extended portion of the ventilation duct is positioned within a bottom portion of the turbine enclosure. The ventilation duct includes a plurality of openings configured to allow air from within the turbine enclosure to be drawn into the ventilation duct through the plurality of openings. The assembly also includes a sensor system coupled in flow communication with the air drawn into the ventilation duct, the sensor system configured to detect fuel in the air.

In yet another aspect, a fuel leak detection system for use in an enclosure is provided. The system includes a ventilation duct extending through an interior cavity of the enclosure such that an extended portion of the ventilation duct is positioned within a bottom portion of the enclosure. The ventilation duct includes a plurality of openings configured to allow air from within the enclosure to be drawn into the ventilation duct through the plurality of openings. The system also includes a sensor system coupled in flow communication with the air drawn into the ventilation duct, the sensor system configured to detect fuel in the air.

DETAILED DESCRIPTION

Embodiments of the present disclosure relate to fuel leak detection systems for use in a gas turbine engine enclosure. In the exemplary embodiment, the fuel leak detection system includes a ventilation duct having a plurality of openings defined therein such that air is drawn into the ventilation duct through the openings. At least some known fuels used in gas turbine engines are heavier than air. As such, the ventilation duct includes an extended portion positioned within a bottom portion of the enclosure such that fuel potentially accumulating in the bottom portion of the enclosure is drawn through openings in the extended portion along with the flow air. The fuel leak detection system also includes a sensor system coupled in flow communication with the flow of air channeled through the ventilation duct. The sensor system detects the presence of fuel in the air. In some embodiments, fuel detection probes of the sensor system are positioned within the extended portion of the ventilation duct. By positioning the probes closer to potential leak sources where the concentration of fuel in air is comparatively high relative to other areas in the enclosure, the reliability and safety of the fuel leak detection system is improved.

Figure 1:
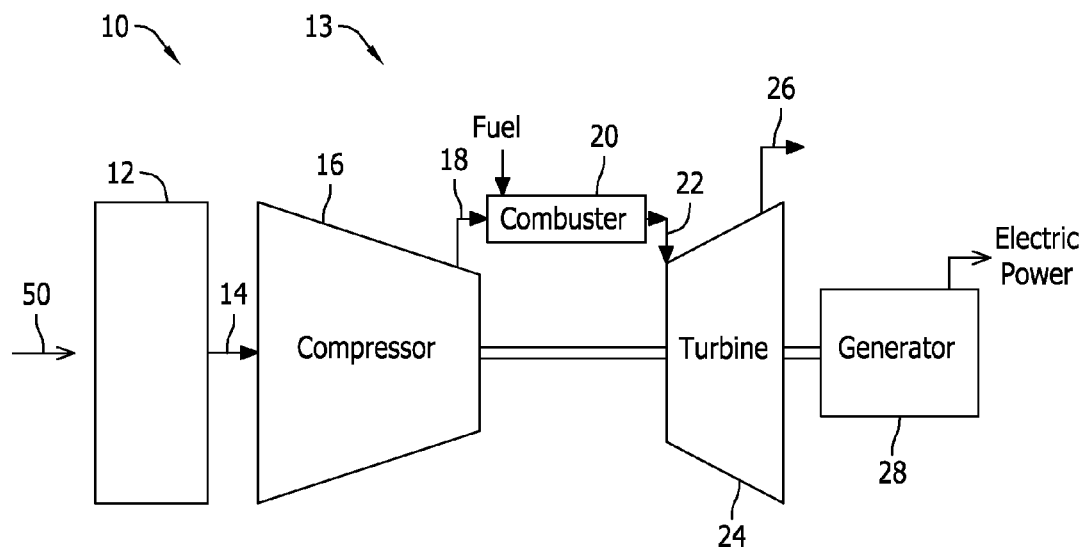
FIG. 1 is schematic illustration of an exemplary gas turbine power system.

FIG. 1 is a schematic diagram of an exemplary gas turbine power system 10. In the exemplary embodiment, gas turbine power system 10 includes a filtration system 12 in serial-flow relationship with a turbine engine assembly 13 that includes an axial flow compressor 16, a combustor section 20, and a gas turbine 24. Intake air 50 is filtered in filtration system 12 and filtered intake air 14 is directed to axial flow compressor 16. Intake air 50 is at ambient air temperature. Compressed air 18 is directed towards combustor section 20 where fuel is injected with compressed air 18 for combustion purposes. Hot gas 22 is discharged from combustor section 20 and is directed towards gas turbine 24 where the thermal energy of hot gas 22 is converted to work. A portion of the work is used to drive compressor 16, and the balance is used to drive an electric generator 28 to generate electric power. A hot exhaust gas mixture 26 is discharged from gas turbine 24 and channeled to either the atmosphere or to a Heat Recovery Steam Generator (HRSG) (not shown).

Figure 2:
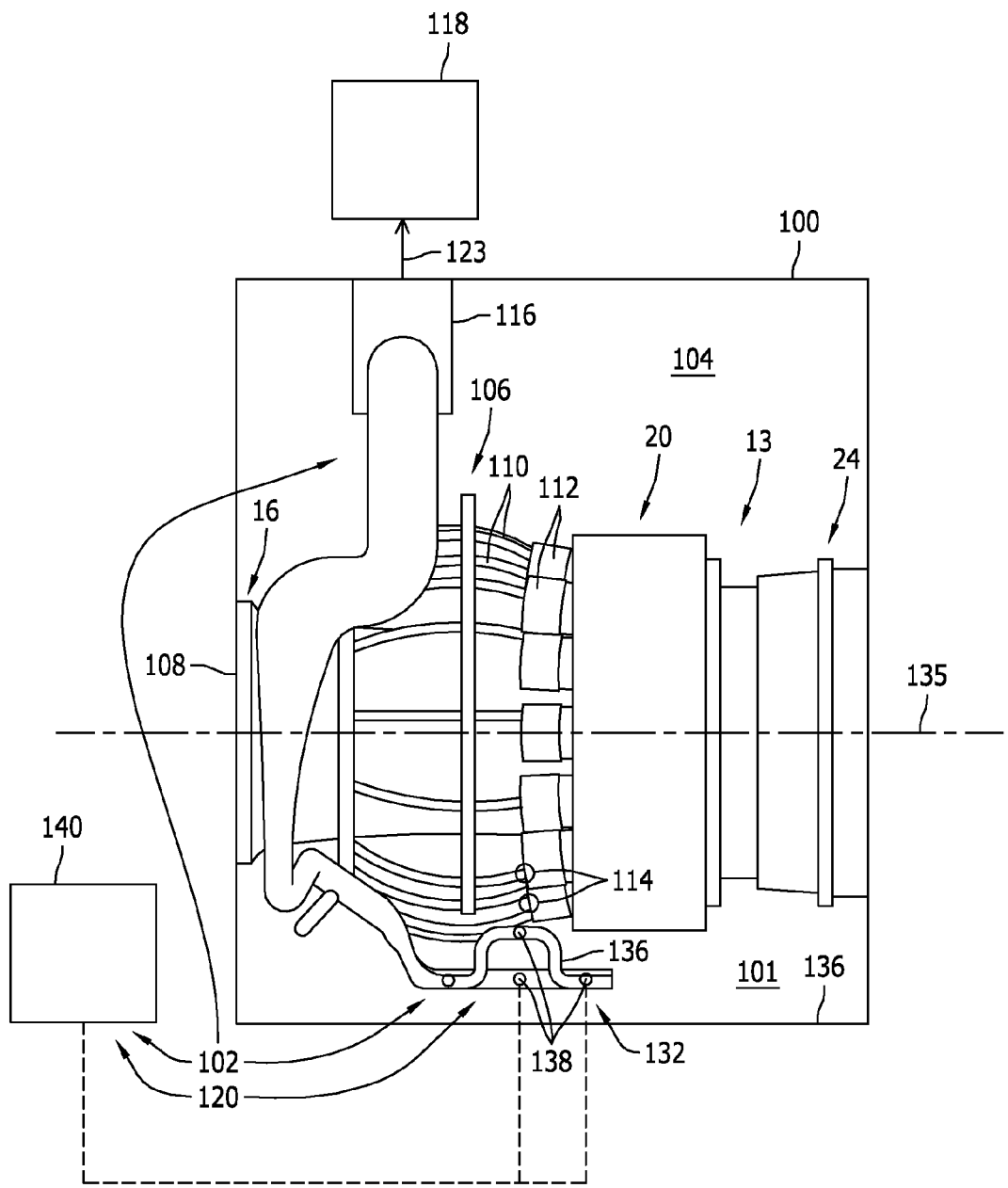
FIG. 2 is a schematic illustration of an exemplary gas turbine engine enclosure that may be used with the gas turbine power system shown in FIG. 1.
Figure 3:
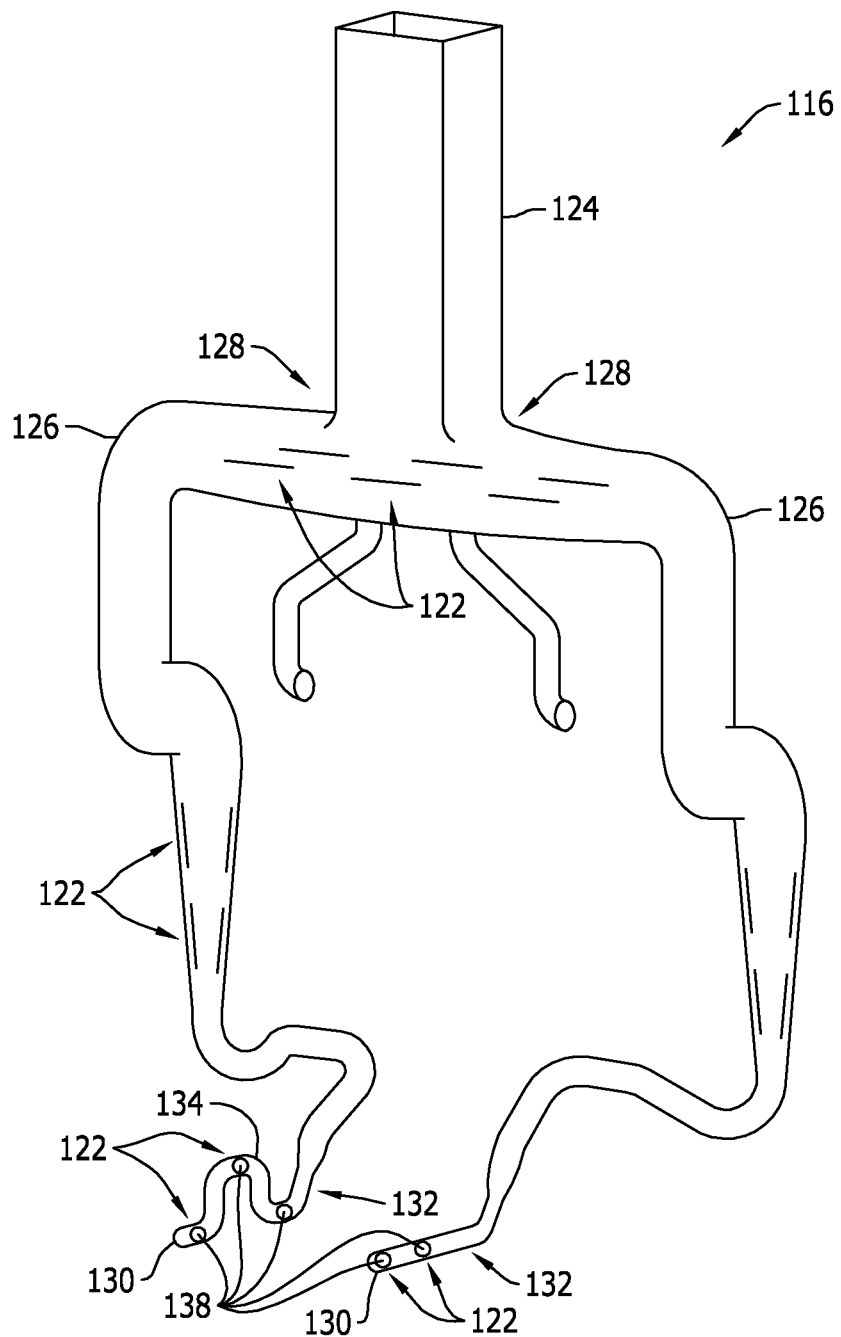
FIG. 3 is a perspective view of an exemplary ventilation duct that may be used with the gas turbine engine enclosure shown in FIG. 2.

FIG. 2 is a schematic illustration of an exemplary turbine engine enclosure 100, and FIG. 3 is a perspective view of an exemplary fuel leak detection system 102. In the exemplary embodiment, enclosure 100 includes an interior cavity 104 sized to receive at least a portion of turbine engine assembly 13. Specifically, enclosure 100 is sized to receive at least a portion of compressor 16, a fuel delivery system 106, combustor section 20, and at least a portion of turbine 24. Fuel delivery system 106 includes a substantially annular fuel manifold 108 having a plurality of fuel conduits 110 that channel fuel towards respective combustors 112 in combustor section 20. In some embodiments, an interface 114 between each fuel conduit 110 and each combustor 112 define a potential fuel leak source (not shown). Alternatively, potential fuel leak sources may be located anywhere along fuel delivery system 106.

Fuel delivery system 106 channels any fuel towards combustor section 20 that enables turbine engine assembly 13 to function as described herein. For example, the fuel may be a vaporized liquid fuel such as, but not limited to, naptha, propane, and Arabian Super Light. Such fuels are generally heavier than air and will potentially accumulate at a bottom portion 101 of enclosure 100 should a leak occur along fuel delivery system 106.

In the exemplary embodiment, interior cavity 104 of enclosure 100 is also sized to receive at least a portion of fuel leak detection system 102 therein. More specifically, fuel leak detection system 102 includes a ventilation duct 116 extending through interior cavity 104, a ventilation fan 118 coupled in flow communication with ventilation duct 116, and a sensor system 120 coupled in flow communication with a flow of ventilation air 123 channeled through ventilation duct 116. Ventilation duct 116 includes a plurality of openings 122 that allow air (not shown) from within enclosure 100 to be drawn into ventilation duct 116 through openings 122 to form the flow of ventilation air 123. For example, in operation, ventilation fan 118 facilitates creating a negative pressure within ventilation duct 116 such that air within enclosure 100 is drawn through openings 122. Openings 122 are located at multiple locations along ventilation duct 116, and may have any shape and/or orientation that enables ventilation duct 116 to function as described herein.

Ventilation duct 116 also includes a first portion 124 and second portions 126 branching from first portion 124 that each extend around components of turbine engine assembly 13 within enclosure 100. Each second portion 126 extends from a first end 128 coupled to first portion 124 towards a second end 130 such that an extended portion 132 of ventilation duct 116 is positioned within bottom portion 101 of enclosure 100 below turbine engine assembly 13. More specifically, extended portion 132 of ventilation duct 116 extends substantially parallel relative to a floor 136 of enclosure 100 such that extended portion 132 extends beyond interface 114 in opposing axial directions. As used herein, the term "axial", "axially", or "coaxially" refers to a direction along or substantially parallel to a centerline axis 135 of turbine engine assembly 13. As such, extended portion 132 is positioned adjacent to the potential fuel leak source at interface 114, which enables air within enclosure 100 that potentially contains fuel to be drawn through openings 122 in each extended portion 132. By locating extended portion 132 below and/or adjacent to a potential fuel leak source, more accurate and reliable fuel leak detection measurements of fuel heavier than air may be obtained by sensor system 120. For example, in one embodiment, one of extended portions 132 includes a raised section 134 extending away from floor 136 of enclosure 100 to position extended portion 132 even closer to interface 114 and/or a potential fuel leak source.

Moreover, a cross-sectional area of second portions 126 of ventilation duct 116 progressively decreases as second portions 126 extend from first ends 128 towards second ends 130. As such, forming second ends 130 of second portions 126 having a smaller cross-sectional area than first ends 128 facilitates reducing dilution of fuel leaks drawn through openings 122 in second ends 130, and facilitates detecting smaller leaks with a higher confidence level. Alternatively, ventilation duct 116 may have any cross-sectional shape that enables fuel detection system 102 to function as described herein.

In the exemplary embodiment, sensor system 120 detects fuel in the air drawn into ventilation duct 116. Sensor system 120 may be any fuel detection mechanism that enables fuel leak detection system 102 to function as described herein. Exemplary sensor systems 120 include, but are not limited to, infrared, catalytic bead, semiconductor, and oxidation sensor systems. For example, in some embodiments, sensor system 120 includes infrared probes 138 and a sensor 140 coupled in electrical communication with infrared probes 138. Infrared probes 138 are coupled in flow communication with the air channeled through extended portion 132 of ventilation duct 116, and sensor 140 is positioned away from the flow of ventilation air 123 to facilitate improving the service life of sensor 140. In an alternative embodiment, infrared probes 138 are positioned at any location within ventilation duct 116 that enables fuel leak detection system 102 to function as described herein.

Because sensor system 120 and, more specifically, infrared probes 138 are positioned adjacent to potential fuel leak sources, sensor system 120 can detect small leaks within enclosure 100 at generally high confidence levels. In some embodiments, sensor system 120 determines potential fuel leaks when a concentration of fuel in the air drawn into ventilation duct 116 is above a predetermined threshold. For example, sensor system 120 may determine potential fuel leaks when a concentration of fuel in the air within bottom portion 101 of enclosure 100 is greater than about 25 percent of the lower explosive limit for the fuel used by turbine engine assembly 13.

The systems and methods described herein facilitate detecting potentially hazardous fuel leaks within gas turbine engine enclosures. In the exemplary embodiment, a sensor system that detects the presence of fuel in air is coupled in flow communication with a ventilation duct extending through a gas turbine engine enclosure. Because fuel channeled towards the gas turbine engine is generally heavier than air, an extended portion of the ventilation duct is positioned within a bottom portion of the enclosure such that air drawn through openings in the extended portion will potentially contain higher concentrations of leaked fuel. The sensor system is coupled in flow communication with the air drawn through openings in the extended portion and channeled through the ventilation duct. As such, positioning the extended portion of the ventilation duct closer to potential fuel leak sources facilitates detecting potential fuel leaks with a higher confidence level and reliability than other known systems.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel leak detection system for use in a turbine enclosure, said fuel leak detection system comprising:

a ventilation duct extending through an interior cavity of the turbine enclosure such that an extended portion of said ventilation duct is positioned within a bottom portion of the turbine enclosure, said ventilation duct comprising a plurality of openings configured to allow air from within the turbine enclosure to be drawn into said ventilation duct through said plurality of openings; and a sensor system coupled in flow communication with the air drawn into said ventilation duct, said sensor system configured to detect fuel in the air.

2. The fuel leak detection system in accordance with claim 1 further comprising a ventilation fan coupled in flow communication with said ventilation duct, said ventilation fan configured to create a negative pressure within said ventilation duct.

3. The fuel leak detection system in accordance with claim 1, wherein said extended portion of said ventilation duct extends parallel relative to a floor of the turbine enclosure.

4. The fuel leak detection system in accordance with claim 3, wherein said extended portion of said ventilation duct comprises a raised section extending away from the floor of the turbine enclosure.

5. The fuel leak detection system in accordance with claim 1, wherein said sensor system comprises an infrared sensor system.

6. The fuel leak detection system in accordance with claim 1, wherein said sensor system comprises a probe coupled in flow communication with the air channeled through said extended portion of said ventilation duct and a sensor coupled in electrical communication with said probe.

7. The fuel leak detection system in accordance with claim 1, wherein said sensor system comprises a probe positioned within said extended portion of said ventilation duct.

8. The fuel leak detection system in accordance with claim 1, wherein said sensor system is configured to determine potential fuel leaks when a fuel concentration of the fuel in the air is greater than a predetermined threshold of a lower explosive limit for the fuel in the air.

9. A gas turbine assembly comprising:
a turbine enclosure comprising an interior cavity;
a ventilation duct extending through said interior cavity such that an extended portion of said ventilation duct is positioned within a bottom portion of said turbine enclosure, said ventilation duct comprising a plurality of openings configured to allow air from within said turbine enclosure to be drawn into said ventilation duct through said plurality of openings; and
a sensor system coupled in flow communication with the air drawn into said ventilation duct, said sensor system configured to detect fuel in the air.

10. The gas turbine assembly in accordance with claim 9 further comprising a ventilation fan coupled in flow communication with said ventilation duct, said ventilation fan configured to create a negative pressure within said ventilation duct.

11. The gas turbine assembly in accordance with claim 9, wherein said extended portion of said ventilation duct extends parallel relative to a floor of the turbine enclosure.

12. The gas turbine assembly in accordance with claim 11, wherein said extended portion of said ventilation duct comprises a raised section extending away from the floor of the turbine enclosure.

13. The gas turbine assembly in accordance with claim 9, wherein said sensor system comprises an infrared sensor system.

14. The as turbine assembly in accordance with claim 9, wherein said sensor system comprises a probe coupled in flow communication with the air channeled through said extended portion of said ventilation duct and a sensor coupled in electrical communication with said probe.

15. The as turbine assembly in accordance with claim 9, wherein said sensor system comprises a probe positioned within said extended portion of said ventilation duct.

16. A fuel leak detection system for use in an enclosure, said fuel leak detection system comprising:
a ventilation duct extending through an interior cavity of the enclosure such that an extended portion of said ventilation duct is positioned within a bottom portion of the enclosure, said ventilation duct comprising a plurality of openings configured to allow air from within the enclosure to be drawn into said ventilation duct through said plurality of openings; and
a sensor system coupled in flow communication with the air drawn into said ventilation duct, said sensor system configured to detect fuel in the air.

17. The fuel leak detection system in accordance with claim 16, wherein said extended portion of said ventilation duct extends parallel relative to a floor of the enclosure.

18. The fuel leak detection system in accordance with claim 16, wherein said sensor system comprises a probe coupled in flow communication with the air channeled through said extended portion of said ventilation duct and a sensor coupled in electrical communication with said probe.

19. The fuel leak detection system in accordance with claim 16, wherein said sensor system comprises a probe positioned within said extended portion of said ventilation duct.

20. The fuel leak detection system in accordance with claim 16, wherein said sensor system is configured to determine potential fuel leaks when a fuel concentration of the fuel in the air is greater than a predetermined threshold of a lower explosive limit for the fuel in the air.

* * * * *